(12) United States Patent
Buratta et al.

(10) Patent No.: US 11,620,065 B2
(45) Date of Patent: *Apr. 4, 2023

(54) VARIABLE LENGTH DEDUPLICATION OF STORED DATA

(71) Applicant: Bottomline Technologies Limited, Reading (GB)

(72) Inventors: Zenon Buratta, Swindon (GB); Andy Dobbels, Farnborough (GB)

(73) Assignee: Bottomline Technologies Limited, Reading (GB)

( * ) Notice: Subject to any disclaimer, the term of this patent is extended or adjusted under 35 U.S.C. 154(b) by 9 days.

This patent is subject to a terminal disclaimer.

(21) Appl. No.: 17/536,918

(22) Filed: Nov. 29, 2021

(65) Prior Publication Data

US 2022/0083246 A1 Mar. 17, 2022

Related U.S. Application Data

(63) Continuation of application No. 16/939,467, filed on Jul. 27, 2020, now Pat. No. 11,194,497, which is a (Continued)

(51) Int. Cl.
*G06F 3/06* (2006.01)

(52) U.S. Cl.
CPC ............ *G06F 3/0641* (2013.01); *G06F 3/067* (2013.01); *G06F 3/0608* (2013.01)

(58) Field of Classification Search
CPC ....... G06F 3/0641; G06F 3/0608; G06F 3/067
See application file for complete search history.

(56) References Cited

U.S. PATENT DOCUMENTS 8,234,468 B1   7/2012  Deshmukh et al.
8,281,066 B1  10/2012  Trimmer et al.
(Continued)

FOREIGN PATENT DOCUMENTS

EP   2684137 A2   1/2014

OTHER PUBLICATIONS

European Patent Office, Communication including International Search Report for European Patent Application 18202018.0, dated Mar. 1, 2019.
(Continued)

*Primary Examiner* — Ryan Bertram
(74) *Attorney, Agent, or Firm* — Richard A. Baker, Jr.

(57) ABSTRACT

A computer-implemented method for providing tenant aware, variable length, deduplication of data stored on a non-transitory computer readable storage medium is described here. The method is performed at least in part by circuitry and the data comprises a plurality of data items. Each of the plurality of data items is associated with a particular tenant of a group of tenants that store data on the storage medium. In addition, a data deduplication data storage medium made up of one or more tenant storage areas and a deduplicated block database stored on the data deduplication data storage medium is described. The tenant storage areas comprise a plurality of data items, where each data item comprises a plurality of item blocks and each item block comprises a pointer to a storage location in a deduplicated block database. The deduplicated block database comprises a plurality of the storage locations and a plurality of data blocks, where the data blocks are unique for an individual tenant storage area, and all unique, contiguous data blocks for the individual tenant storage area are stored as a single combined block.

20 Claims, 6 Drawing Sheets

Related U.S. Application Data continuation of application No. 16/389,410, filed on Apr. 19, 2019, now Pat. No. 10,884,643, which is a continuation of application No. 15/791,614, filed on Oct. 24, 2017, now Pat. No. 10,282,129.

(56) References Cited

U.S. PATENT DOCUMENTS

| | | |
|---|---|---|
| 8,521,704 B2 | 8/2013 | Bandopadhyay |
| 8,712,963 B1 | 4/2014 | Douglis et al. |
| 9,092,151 B1 | 7/2015 | Floyd et al. |
| 9,128,951 B1 | 9/2015 | Agrawal et al. |
| 9,396,341 B1 | 7/2016 | Chandra et al. |
| 9,430,490 B1 | 8/2016 | Lewis |
| 9,465,808 B1 | 10/2016 | Karr et al. |
| 9,679,040 B1 | 6/2017 | Davis et al. |
| 10,437,502 B2 | 10/2019 | Shadrin |
| 2002/0049950 A1 | 4/2002 | Loaiza et al. |
| 2006/0129610 A1 | 6/2006 | Agarwal |
| 2008/0133561 A1 | 6/2008 | Dubnicki |
| 2009/0132543 A1 | 5/2009 | Chatley et al. |
| 2013/0018854 A1* | 1/2013 | Condict .............. H04L 67/1095 707/E17.002 |
| 2013/0238570 A1 | 9/2013 | Rao et al. |
| 2014/0095439 A1 | 4/2014 | Ram |
| 2015/0213047 A1 | 7/2015 | Madan |
| 2016/0004716 A1 | 1/2016 | Akirav et al. |
| 2016/0110261 A1 | 4/2016 | Parab |
| 2016/0154839 A1 | 6/2016 | Bezawada et al. |
| 2017/0090786 A1 | 3/2017 | Parab et al. |
| 2017/0192712 A1 | 7/2017 | Kenkre |
| 2018/0329645 A1 | 11/2018 | Guerra Delgado et al. |

OTHER PUBLICATIONS

European Patent Office, Communication including International Search Report for European Patent Application 18202018.0, dated May 15, 2019.

* cited by examiner

| Block database 22 | |
|---|---|
| Storage location 50 | Block 44 |
| 001 | abcd (44a) |
| 002 | 12 (44b) |
| 003 | efghijk (44c) |
| 004 | 56 (44d) |
| 005 | 54 (44f) |
| 006 | 42 (44h) |

FIG. 6

| Deduplicated data item 42b | |
|---|---|
| Storage location 50 | Location ID 52 |
| 001 | 01 |
| 005 | 02 |
| 003 | 03 |
| 006 | 04 |

Set of unique blocks 56a

| Data Item ID 58 | Location ID 52 | Storage location 50 |
|---|---|---|
| 3 | 01 | 001 |
| 3 | 04 | 002 |
| 5 | 03 | 003 |
| 3 | 03 | 004 |
| 6 | 05 | 005 |
| 5 | 05 | 006 |

FIG. 9

Deduplicated data item 42c

| Storage location 50 | Location ID 52 |
|---|---|
| 001 | 01 |
| 010 | 02 |
| 004 | 03 |
| 002 | 04 |
| 012 | 05 |

FIG. 10

Set of unique blocks 56b

| Data Item ID 58 | Location ID 52 | Storage location 50 |
|---|---|---|
| 3 | 01 | 001 |
| 3 | 03 | 002 |
| 5 | 03 | 003 |
| 6 | 05 | 005 |
| 5 | 05 | 006 |

FIG. 11

Deduplicated data item 42d

| Storage location 50 | Location ID 52 |
|---|---|
| 001 | 01 |
| 010 | 02 |
| 002 | 03 |
| 012 | 04 |

FIG. 12

VARIABLE LENGTH DEDUPLICATION OF STORED DATA

CROSS REFERENCE TO RELATED APPLICATION

The present application is a continuation patent application of U.S. patent application Ser. No. 16/939,467, "Variable Length Deduplication of Stored Data", filed on Jul. 27, 2020, now U.S. Pat. No. 11,194,497, issued on Dec. 7, 2021. U.S. patent application Ser. No. 16/939,467 is a continuation patent application of U.S. patent application Ser. No. 16/389,410, "Variable Length Deduplication of Stored Data", filed on Apr. 19, 2019, now U.S. Pat. No. 10,884,643, issued on Jan. 5, 2021. U.S. patent application Ser. No. 16/389,410 is a continuation of U.S. patent application Ser. No. 15/791,614, "Tenant Aware, Variable Length, Deduplication of Stored Data", filed on Oct. 24, 2017, now U.S. Pat. No. 10,282,129, said applications and patents included herein by reference.

BACKGROUND

Technical Field

The present disclosure relates generally to digital data storage and more particularly to data deduplication.

Description of the Related Art

Cloud computing and the long-term storage of business documents has significantly increased data storage requirements. This has necessitated the use of data storage devices with larger storage capacities. Consequently, ever larger amounts of data are available to users. To reduce the requirement of ever larger numbers of data storage devices, the conservation of storage space and the use of space saving techniques has become particularly important.

Data deduplication is one way of performing duplicate data detection and removal from storage. Data deduplication is used to reduce the amount of space required to store files by recognizing redundant data patterns. For example, a deduplicated data system may reduce the amount of space required to store similar files by dividing the files into chunks and storing only unique chunks. In this example, each deduplicated file may simply consist of a list of chunks that make up the file.

Traditional deduplicated data systems often divide files into fixed-width chunks. But, this approach often overlooks large amounts of duplicate information, because a long sequence of data in one file may begin at a fixed-width chunk boundary of the file, while the same long sequence of data may begin in the middle of a fixed-width chunk of another file, resulting in no identical fixed-width chunks that may be deduplicated between the two files.

To facilitate the deduplication of identical sequences of data at arbitrary offsets within files, some data deduplication methods divide files into variable-width chunks. Unfortunately, determining the optimal chunk boundaries typically involves performing large numbers (millions or billions) of calculation for each file, resulting in the consumption of computing resources and time delays.

SUMMARY OF THE INVENTIONS

Data deduplication is further complicated in systems storing large sets of documents on behalf of multiple tenants (e.g., users or customers), because data deduplication may result in the undesirable amalgamation of data between tenants (e.g., erroneously including the social security number for tenant A in the document of tenant B). Such concerns are particularly relevant in cloud computing environments (e.g., a SaaS environment).

A method is needed to reduce the data storage requirements, while maintaining the segregation of tenant data. A method is also needed to efficiently find variable sized blocks for data deduplication.

The present disclosure provides a computer-implemented method for performing tenant aware, variable length, deduplication of digital data. This method is able to efficiently find duplicate data by being aware of the structure of each data item and using the structure of the data item to split the data item into blocks. By restricting deduplication of blocks to data items associated with the same tenant, the efficiency of the method is increased while also maintaining segregation of tenant data.

According to one aspect, there is provided a computer-implemented method for providing tenant aware, variable length, deduplication of data stored on a non-transitory computer readable storage medium. The method is performed at least in part by circuitry, the data comprises a plurality of data items, and each of the plurality of data items is associated with a particular tenant of a group of tenants. The method includes a step of receiving, from the storage medium, a set of data items, said data items arranged into blocks; identifying a set of unique contiguous blocks using block markers; receiving, from the storage medium, the contiguous unique blocks, wherein each block of the contiguous unique blocks has been found in only one of the data items; identifying at least one other block of the contiguous unique blocks that is found only in the determined data item and where a combination of the particular block and the at least one block is a contiguous block found in the determined data item; combining the unique contiguous blocks from the set of unique blocks to create a single unique contiguous block; storing the combined block on the storage medium; removing from the storage medium the particular combined block and the identified at least one other block.

Further, the method includes a step of updating a deduplicated copy of the particular data item to: replace the storage identifiers associated with the particular block and the at least one other block with a storage identifier describing a location of the combined block on the storage medium; and replace the location identifiers associated with the particular block and the at least one other block with a location identifier associated with the storage identifier of the combined block and describing a location of the combined block in the particular data item; generating a deduplicated version of the respective data item on the storage medium.

The generation of the deduplicated version of the respective data item comprises: determining a plurality of blocks included in the respective data item; and creating the deduplicated version of the respective data item; performing deduplication comprising: determining if each respective block exists on the storage medium; storing the respective block on the storage medium. Further, the method includes a step of updating the deduplicated version of the respective data item to include: describing a location of the respective block on the storage medium using the storage identifier; and describing a location of the respective block in the respective data item using the location identifier associated with the storage identifier of the respective block; and storing the deduplicated version of the respective data item in the storage medium; replacing the unique contiguous blocks with the respective single unique contiguous block in the set of unique contiguous blocks; specifying a storage location and location identifier for the combined single unique contiguous block; replacing the combined single unique contiguous block in the storage location with content of the combination of unique contiguous blocks to perform deduplication; and updating the data items to remove reference of the unique contiguous blocks, wherein the data item refers to the location of the combined single unique contiguous block.

Alternatively or additionally, the plurality of blocks are determined based on a file format of the data items.

Alternatively or additionally, the file format of the set of data items includes block markers for identifying existing blocks within each of the set of data items.

Alternatively or additionally, the file format is the Portable Document Format (PDF).

Alternatively or additionally, the set of data items is limited to data items that have at least one of: a creation date prior to a creation threshold date or a last access date prior to an access threshold date.

Alternatively or additionally, for a given data item, the creation threshold date is determined based on a current date and a given statistic for a tenant associated with the given data item. For a given data item, the access threshold may be determined based on the current date and a particular statistic for the associated tenant. The particular statistic and the given statistic for the associated tenant may describe a likelihood of the associated tenant accessing a previously stored data item based on at least one of a creation date or last access data of the previously stored data item and is determined based on historical data for the associated tenant.

Alternatively or additionally, the particular statistic and/or the given statistic comprises at least one of a historical mean, median, mode, standard deviation, or variation of days since creation date for data items accessed by the associated tenant.

Alternatively or additionally, the method further includes receiving, from the storage medium, a set of unique blocks associated with the given tenant, wherein each block of the set of unique blocks has been found in only one of the data items associated with the given tenant. For each particular block in the set of unique blocks, the method includes: determining the particular data item that the particular block was found in, identifying at least one other block of the set of unique blocks that is found only in the determined data item and where a combination of the particular block and the at least one block is a contiguous block found in the determined data item, combining the particular block and the identified at least one other block into a combined block, storing the combined block in association with the given tenant on the storage medium, removing from the storage medium the particular block and the identified at least one other block, and updating the deduplicated copy of the particular data item. The deduplicated copy of the particular data item is updated to: replace the storage identifiers associated with the particular block and the at least one other block with a storage identifier describing a location of the combined block on the storage medium and replace the location identifiers associated with the particular block and the at least one other block with a location identifier associated with the storage identifier of the combined block and describing a location of the combined block in the particular data item.

Alternatively or additionally, the set of unique blocks is limited to at least one of: blocks created more than a duration of time ago or particular blocks where more than a threshold number of deduplicated versions of data items have been generated on the storage medium for the tenant associated with the set of unique blocks since the particular block was stored on the storage medium in association with the given tenant.

Alternatively or additionally, generating the deduplicated version of the respective data item further includes: after performing deduplication and prior to storing the deduplicated version of the respective data item in the storage medium, generating a verification copy of the respective data item from the deduplicated version of the respective data item. Generating the verification copy includes: for each of the storage identifiers and the associated location identifiers, placing at the location in the verification copy described by the location identifier, the respective block stored at the location in the storage medium described by the storage identifier, comparing the verification copy to the respective data item. Storing the deduplicated version of the respective data item in the storage medium further includes only storing the deduplicated version of the respective data item on the storage medium when the verification copy and the respective data item match.

Alternatively or additionally, when the verification copy and the respective data item match, moving the respective data item from the storage medium to a backup storage location.

Alternatively or additionally, determining if the respective block exists on the storage medium in association with the given tenant includes: applying a hash function to the respective block to determine a hash value for the respective block, comparing the hash value for the respective block to hash values of stored blocks located on the storage medium generated by applying the hash function to the stored blocks, determining that the respective block exists on the storage medium in association with the given tenant when the hash value for the respective block matches one of the hash values of the stored blocks, and determining that the respective block does not exist on the storage medium in association with the given tenant when the hash value for the respective block does not match one of the hash values of the stored blocks.

Alternatively or additionally, storing the respective block in association with the given tenant on the storage medium includes storing the hash value for the respective block.

Alternatively or additionally, the respective block stored in the storage medium are compressed prior to storage and the compressed block is stored in the storage medium.

According to another aspect, there is provided a data deduplication device for providing tenant aware, variable length, deduplication of data. The device includes a non-transitory computer readable medium and circuitry. The non-transitory computer readable storage medium stores the data. The data includes a plurality of data items and each of the plurality of data items is associated with a particular tenant of a group of tenants. The circuitry is configured to receive, from the storage medium, a set of data items associated with a given tenant of the group of tenants. For each respective data item of the set of data items, the circuitry generates a deduplicated version of the respective data item on the storage medium. The generation of the deduplicated version of the respective data item includes: determining a plurality of blocks included in the respective data item, creating the deduplicated version of the respective data item, and performing deduplication. Performing deduplication includes, for each respective block of the determined plurality of blocks: determining if the respective block exists on the storage medium in association with the given tenant, when the respective block does not exist on the storage medium in association with the given tenant, storing the respective block in association with the given tenant on the storage medium, updating the deduplicated version of the respective data item to include a storage identifier describing a location of the respective block on the storage medium and a location identifier associated with the storage identifier of the respective block and describing a location of the respective block in the respective data item, and storing the deduplicated version of the respective data item in the storage medium.

Alternatively or additionally, the plurality of blocks are determined based on a file format of the data items and the file format of the set of data items includes block markers for identifying existing blocks within each of the set of data items.

Alternatively or additionally, the set of data items is limited to data items that have at least one of: a creation date prior to a creation threshold date or a last access date prior to an access threshold date.

Alternatively or additionally, the circuitry is further configured to: receive, from the storage medium, a set of unique blocks associated with the given tenant, wherein each block of the set of unique blocks has been found in only one of the data items associated with the given tenant; for each particular block in the set of unique blocks: determine the particular data item that the particular block was found in; identify at least one other block of the set of unique blocks that is found only in the determined data item and where a combination of the particular block and the at least one block is a contiguous block found in the determined data item; combine the particular block and the identified at least one other block into a combined block; store the combined block in association with the given tenant on the storage medium; remove from the storage medium the particular block and the identified at least one other block; update the deduplicated copy of the particular data item to: replace the storage identifiers associated with the particular block and the at least one other block with a storage identifier describing a location of the combined block on the storage medium; and replace the location identifiers associated with the particular block and the at least one other block with a location identifier associated with the storage identifier of the combined block and describing a location of the combined block in the particular data item.

Alternatively or additionally, determining if the respective block exists on the storage medium in association with the given tenant includes: applying a hash function to the respective block to determine a hash value for the respective block; comparing the hash value for the respective block to hash values of stored blocks located on the storage medium generated by applying the hash function to the stored blocks; when the hash value for the respective block matches one of the hash values of the stored blocks, determining that the respective block exists on the storage medium in association with the given tenant; and when the hash value for the respective block does not match one of the hash values of the stored blocks, determining that the respective block does not exist on the storage medium in association with the given tenant.

According to a further aspect, there is provided a computer-implemented method for combining unique contiguous blocks generated during data deduplication of data stored on a non-transitory computer readable storage medium. The method is performed at least in part by circuitry, the data comprises a plurality of data items, and each of the plurality of data items is associated with a particular tenant of a group of tenants. The method includes receiving, from the storage medium, a set of unique blocks associated with a given tenant. Each block of the set of unique blocks has been found in only one data item associated with the given tenant. For each particular block in the set of unique blocks, a particular data item that the particular block was found in is determined. At least one other block of the set of unique blocks is identified that is found only in the determined data item and where a combination of the particular block and the at least one block is a contiguous block found in the determined data item. The particular block and the identified at least one other block are combined into a combined block. The combined block is stored in association with the given tenant on the storage medium. The particular block and the identified at least one other block are removed from the storage medium. The deduplicated copy of the particular data item is updated to: replace the storage identifiers associated with the particular block and the at least one other block with a storage identifier describing a location of the combined block on the storage medium and replace the location identifiers associated with the particular block and the at least one other block with a location identifier associated with the storage identifier of the combined block and describing a location of the combined block in the particular data item.

While a number of features are described herein with respect to embodiments of the inventions; features described with respect to a given embodiment also may be employed in connection with other embodiments. The following description and the annexed drawings set forth certain illustrative embodiments of the inventions. These embodiments are indicative, however, of but a few of the various ways in which the principles of the inventions may be employed. Other objects, advantages, and novel features according to aspects of the inventions will become apparent from the following detailed description when considered in conjunction with the drawings.

BRIEF DESCRIPTION OF THE DRAWINGS

The annexed drawings, which are not necessarily to scale, show various aspects of the inventions in which similar reference numerals are used to indicate the same or similar parts in the various views.

DETAILED DESCRIPTION

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present disclosure provides in one embodiment a computer-implemented method for providing tenant aware, variable length, deduplication of data stored on a non-transitory computer readable storage medium. The method is performed at least in part by circuitry and the data comprises a plurality of data items. Each of the plurality of data items is associated with a particular tenant of a group of tenants that store data on the storage medium.

Figure 1:
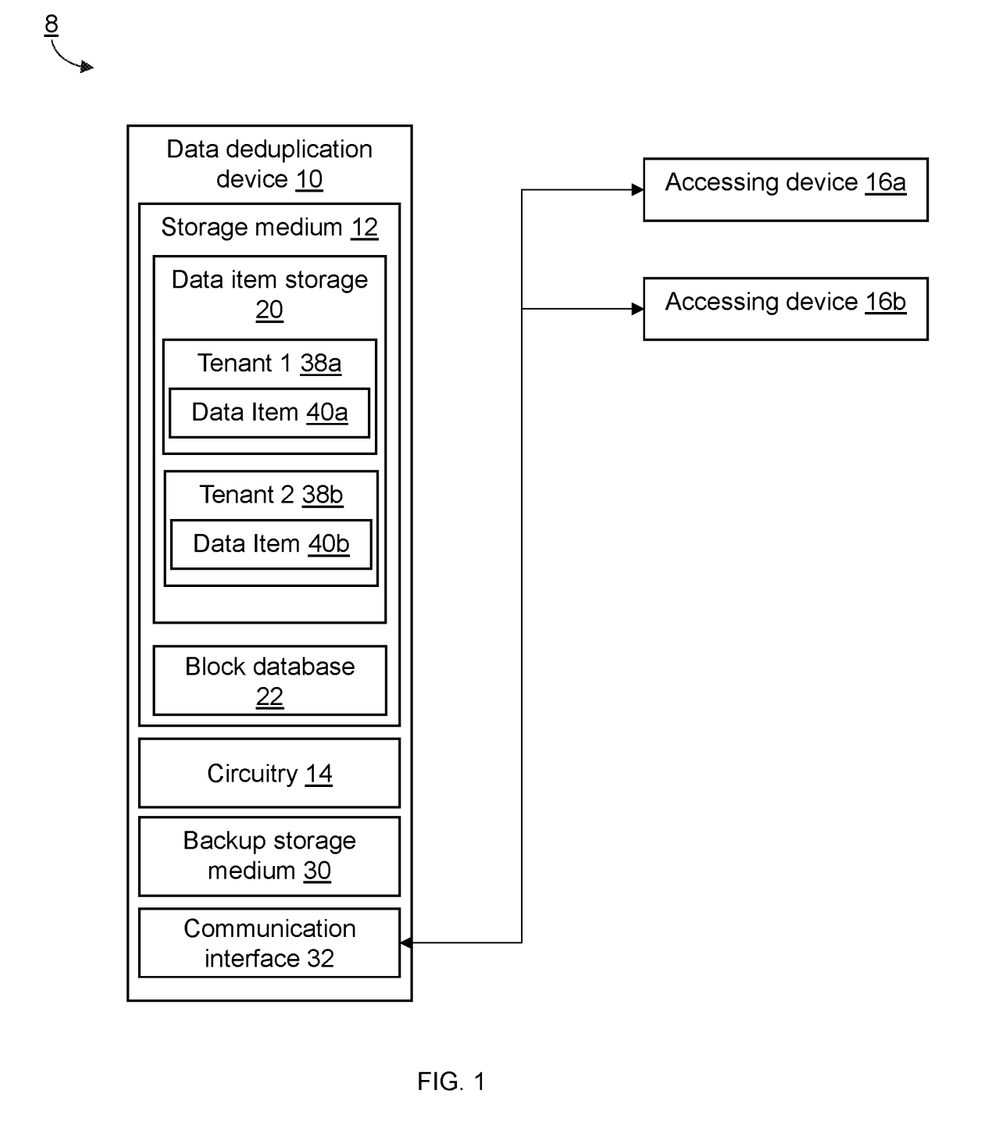
FIG. 1 is a schematic diagram of an exemplary data deduplication system including a data deduplication device.

Turning to FIG. 1, an exemplary data deduplication system 8 including a data deduplication device 10 and accessing devices 16a, 16b is shown. The data deduplication device 10 includes a non-transitory computer readable medium 12 and circuitry 14. The data deduplication device 10 may also include a backup storage medium 30 and a communication interface 32. The data deduplication device 10 stores data including a plurality of data items 40a,40b, where each of the plurality of data items 40a,40b is associated with a particular tenant 38 of a group of tenants 38a, 38b. The data items 40a,40b are stored in a data item storage 20. The circuitry is configured to perform tenant aware, variable length, deduplication of the data stored on the storage medium 12.

The data deduplication device 10 may comprise a server that receives and stores data from various tenants 38a, 38b. For example, each tenant 38a, 38b may comprise a single account accessed by one or more accessing devices 16a, 16b. As an example, each tenant 38a, 38b may comprise a corporation or business and each user may comprise an employee with permission to access data stored by their employer (i.e., tenant 38a, 38b) on the data deduplication device 10. For example, the tenants 38a, 38b may store accounting documents (e.g., invoices) as data items 40a,40b in the storage medium 12. The data deduplication device 10 may be accessed by the tenants 38a, 38b as a cloud service (e.g., as a software as a service (SaaS) application).

Figure 2:
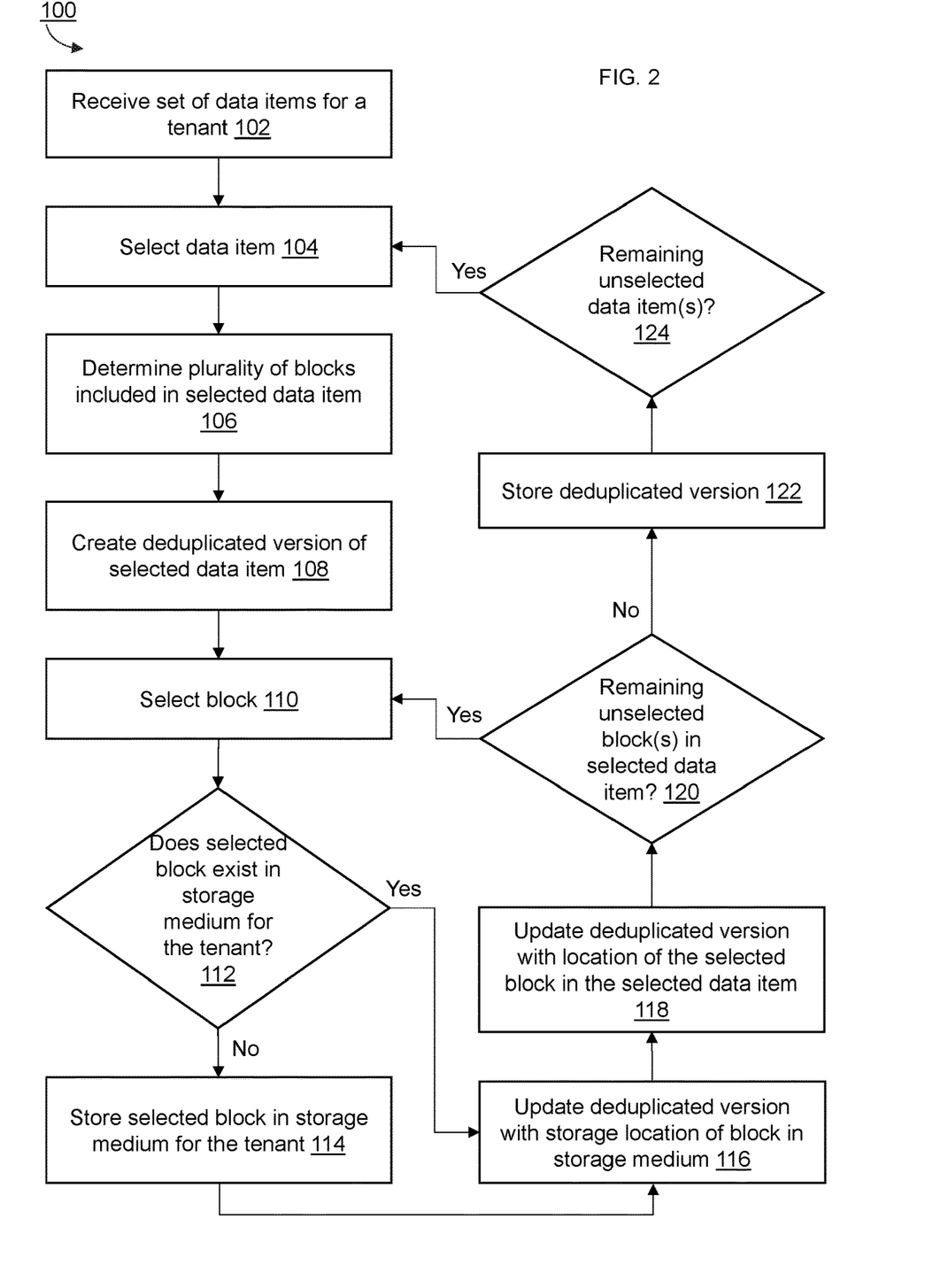
FIG. 2 is a block diagram depicting an exemplary method for performing tenant aware, variable length, data deduplication.

Turning to FIG. 2, a computer-implemented method 100 for providing tenant aware, variable length, deduplication of data stored on a non-transitory computer readable storage medium is shown. The method 100 is performed at least in part by the circuitry 14. The data that the method acts on includes a plurality of data items 40a,40b, where each of the plurality of data items is associated with a particular tenant 38a, 38b of a group of tenants.

In process block 102, a set of data items 40a,40b associated with a given tenant 38a, 38b of the group of tenants is received from the storage medium 12. As described below, the storage medium 12 stores data for a number of different tenants 38a, 38b. To ensure privacy of the stored data, data deduplication is performed within a tenant. In this way, the privacy of information stored in the data items 40a,40b is improved.

In process block 104, a data item 40a,40b is selected from the received set of data items. In process block 106, a plurality of blocks 44 (collectively, 44a,44b,44c,44d,44e, 44f,ffg,44h) included in the respective data item 40a,40b are determined. For example, the plurality of blocks 44 may be determined based on a file format of the data items. That is, the file format of the set of data items may include block markers for identifying existing blocks 44 within each of the set of data items. For example, the file format may be the Portable Document Format (PDF), Extensible Markup Language (XML) format, or any other suitable format including block markers for identifying existing blocks. By using blocks 44 identified by the file format of the data items 40a,40b, the method 100 may perform variably sized data deduplication, while avoiding the computing resource intensive process of dividing a data item 40a,40b into blocks having a variable size.

The set of data items 40a,40b may be limited to data items 40a,40b that have at least one of: a creation date prior to a creation threshold date or a last access date prior to an access threshold date. The creation date may refer to the date that the data item 40a,40b was first saved on any computer readable medium (e.g., the accessing device 16a, 16b) or the date that the data item 40a,40b was saved to the data deduplication device 10. The last access date may refer to the most recent date that the data item 40a,40b was accessed by the tenant 38a, 38b on any computer readable medium (e.g., the accessing device 16a, 16b or the data deduplication device 10).

For a given data item 40a,40b, the creation threshold date may be determined based on a current date and a given statistic for a tenant 38a, 38b associated with the given data item 40a,40b. Similarly, for a given data item 40a,40b, the access threshold may be determined based on the current date and a particular statistic for the associated tenant 38a, 38b. The particular statistic and the given statistic for the associated tenant 38a, 38b may describe a likelihood of the associated tenant 38a, 38b accessing again a previously stored data item 40a,40b based on at least one of a creation date or last access data of the previously stored data item 40a,40b and is determined based on historical data for the associated tenant. That is, the data deduplication device 10 may store data for each tenant 38a, 38b that includes the date(s) that the tenant 38a, 38b has previously accessed data items 40a,40b stored on the data deduplication device 10. The data deduplication device 10 may then analyze this data to determine statistical data related to how often a tenant 38a, 38b accesses data items 40a,40b stored on the data deduplication device 10. For example, the particular statistic and/or the given statistic may include at least one of a historical mean, median, mode, standard deviation, or variation of days since creation date that a data item 40a,40b is last accessed by the associated tenant 38a, 38b.

Waiting to perform data deduplication is advantageous, because it is more resource intensive to access a deduplicated file than it is to access the original file. By using the statistical data, the data deduplication device 10 may avoid performing data deduplication until it is unlikely that the given tenant 38a, 38b will access the data item 40a,40b again. In this way, the data deduplication device 10 may attempt to avoid (or at least reduce the likelihood of) accessing a deduplicated file 42a,42b,42c,42d.

In process block 108, a deduplicated version of the selected data item is created. In process block 110, a block 44 of the determined plurality of blocks 44 is selected. In decision block 112, a determination is made regarding whether the selected block 44 exists on the storage medium 12 in association with the given tenant.

Determining if the respective block 44 exists on the storage medium in association with the given tenant may include (1) applying a hash function to the respective block 44 to determine a hash value for the respective block 44 and (2) comparing the hash value for the respective block 44 to hash values of stored blocks 44 located on the storage medium 12 generated by applying the same hash function to the stored blocks 44. When the hash value for the respective block 44 matches the hash values for one of the stored blocks 44, the determination may be that the respective block 44 exists on the storage medium 12 in association with the given tenant 38*a*, 38*b*. Conversely, when the hash value for the respective block 44 does not match one of the hash values of the stored blocks 44, the determination may be that the respective block 44 does not exist on the storage medium 12 in association with the given tenant 38*a*, 38*b*. To enable comparing the hash value of stored blocks, storing the respective block 44 in association with the given tenant on the storage medium may include storing the hash value for the respective block on the storage medium 12.

When the selected block 44 does not exist on the storage medium 12 in association with the given tenant, then processing moves to process block 114. In process block 114, the selected block 44 is stored in association with the given tenant 38*a*, 38*b* on the storage medium 12. Blocks 44 stored in the storage medium 12 may be compressed prior to storage and the compressed block may be stored in the storage medium 12. In this way, the space required to store blocks 44 on the storage medium 12 may be reduced. Block compression may be performed using a lossless compression medium (e.g., GZip) to ensure data integrity.

Following process block 114 or if the selected block 44 exists on the storage medium 12 in association with the given tenant, processing moves to process block 116. In process block 116, the deduplicated version of the respective data item is updated to include a storage identifier 50 describing a location of the selected block 44 on the storage medium 12. In process block 118, the deduplicated version 42*a*,42*b*,42*c*,42*d* of the respective data item 40*a*,40*b* is further updated to include a location identifier 52 associated with the storage identifier 50 of the respective block 44 and describing a location of the respective block 44 in the respective data item 40*a*,40*b*.

In decision block 120, a check is performed to determine if there are any remaining unselected block(s) 44 in the selected data item 40*a*,40*b*. If there are remaining unselected block(s) 44, then processing returns to process block 110. If not, then the deduplicated version of the respective data item is stored in the storage medium 12 in process block 122.

After storing the deduplication version 42*a*,42*b*,42*c*,42*d* of the selected data item, a determination is made in decision block 124 regarding whether there are any remaining unselected data item(s) 40*a*,40*b*. If yes, then processing returns to process block 104.

Prior to storing the deduplicated version 42*a*,42*b*,42*c*,42*d* of the respective data item in the storage medium 12, a verification copy of the respective data item from the deduplicated version 42*a*,42*b*,42*c*,42*d* of the respective data item may be generated. Generating the verification copy includes, for each of the storage identifiers 50 and the associated location identifiers 52, placing at the location in the verification copy described by the location identifier 52, the respective block 44 stored at the location in the storage medium 12 described by the storage identifier. Generating the verification copy also includes comparing the verification copy to the respective data item and only storing the deduplicated version of the respective data item on the storage medium 12 when the verification copy and the respective data item match. If the verified copy does not match the respective data item 40*a*,40*b*, an error may be generated.

Generating the verification copy may also include, when the verification copy and the respective data item match, permitting the respective data item to be moved from the storage medium 12 to a backup storage location 30 (e.g., at a later time). In this way, available space may be further increased on the storage medium 12 by removing deduplicated files (e.g., that are seldom accessed) to the backup storage location 30.

Figure 3:
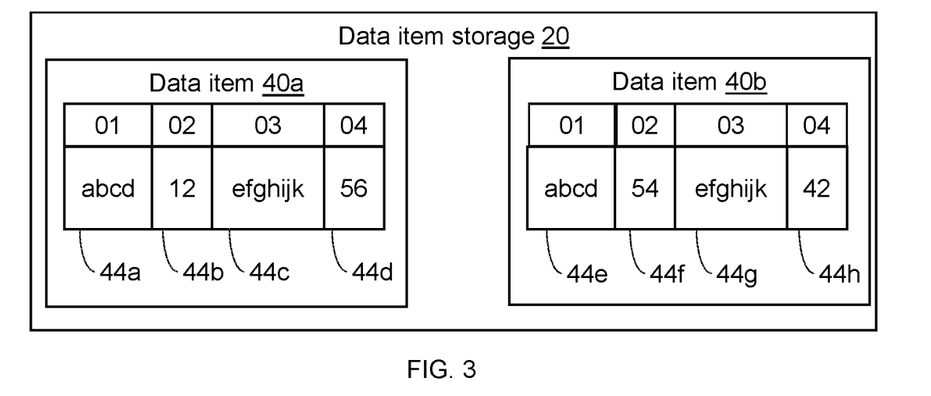
FIG. 3 is a schematic diagram of an exemplary data item storage including data items.
Figure 4:
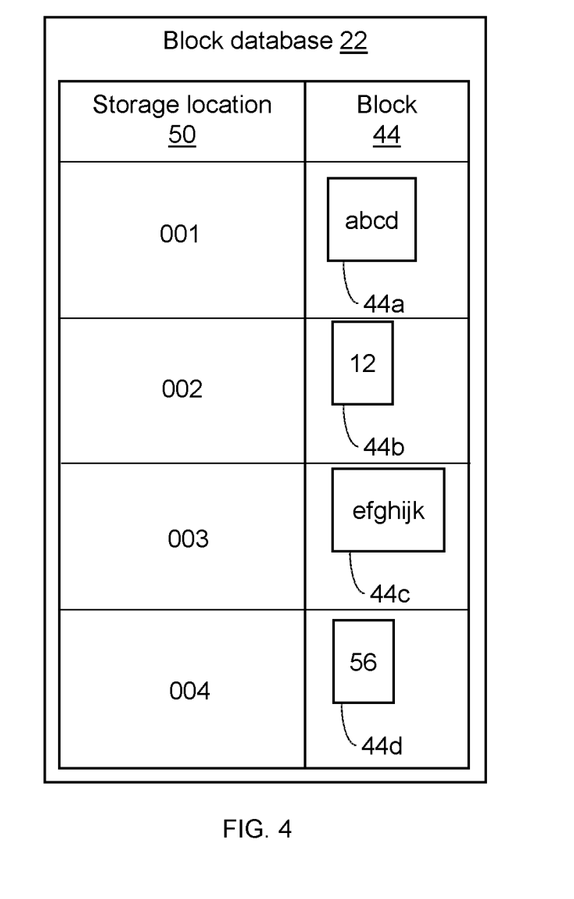
FIGS. 4 and 6 are schematic diagrams of exemplary block databases.
Figure 5:
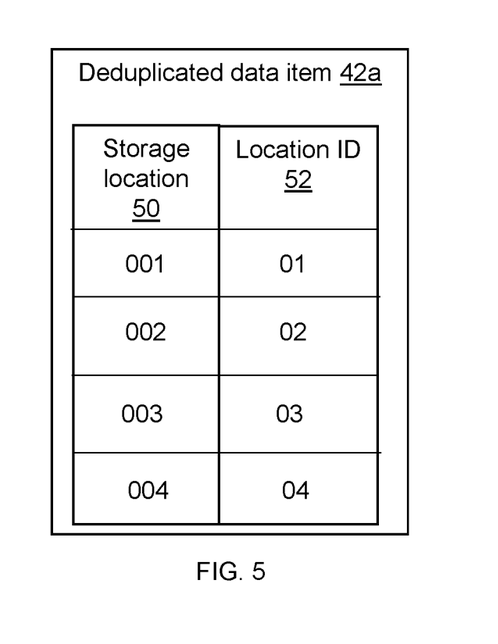
FIGS. 5 and 7 are schematic diagrams of exemplary deduplicated data items.

Turning to FIGS. 3-7, deduplication of two data items 40*a*,40*b* is shown. Two data items 40*a*, 40*b* that are associated with the same tenant 38*a*, 38*b* are shown in FIG. 3. Each data item 40*a*,40*b* includes four data blocks 44. Assuming that the block database 22 for the tenant 38*a*, 38*b* is empty, each of the blocks 44 from the first data item 40*a* are added to the block database 22 at a different storage location 50 in the block database 22. A deduplicated version of the first data item 42*a* is shown in FIG. 5. As shown, the deduplicated data item 42*a* includes a list of storage locations 50 (pointing to particular blocks 44 stored in the block database 22) and a location ID 52 indicating where the particular block 44 is placed in the data item 40*a*. For example, the first deduplicated data item 42*a* shows that the first location in the data item 40*a* (identified by location ID 01) is stored at storage location 001 (block contents "abcd"). Similarly, the second location in data item 40*a* (identified by location ID 02) is stored at storage location 002 (block contents "12"), the third location in data item 40*a* (identified by location ID 03) is stored at storage location 003 (block contents "efghijk"), and the fourth location in data item 40*a* (identified by location ID 04) is stored at storage location 004 (block contents "56").

Figure 6:
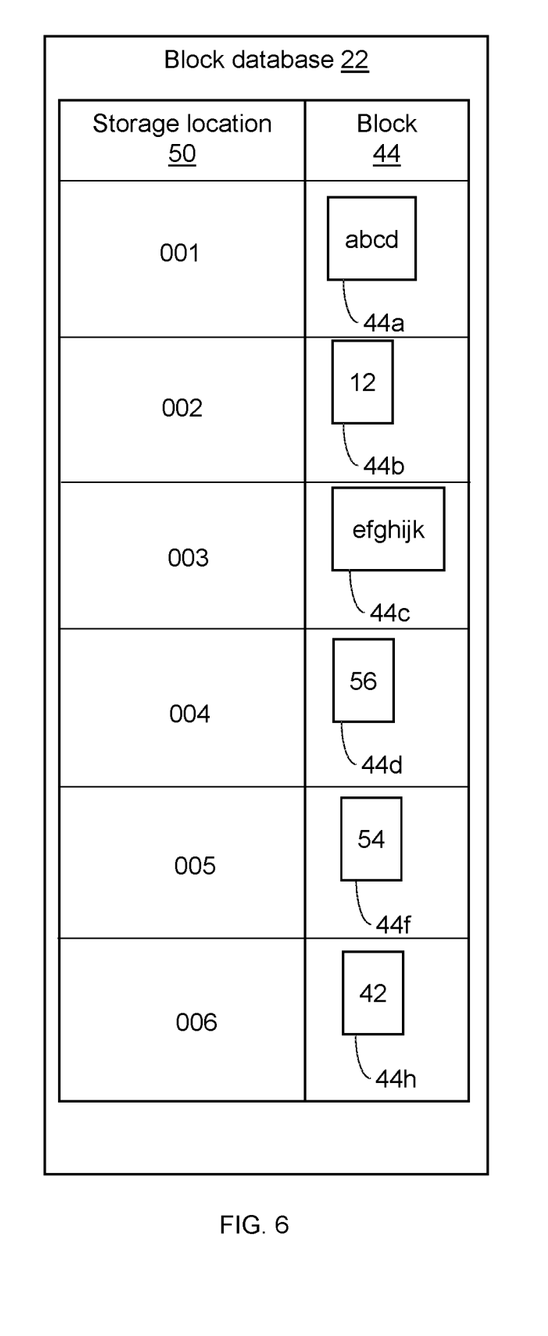

After deduplication of the first data item 40*a*, deduplication of the second data item 40*b* is performed. Data deduplication begins with the block database 22 shown in FIG. 4 and the blocks 44 from the second data item 40*b* that are not found in the block database 22 are added to the block database 22. For example, the first block 44*a* "abcd" of the second data item 40*b* is found in the block database 22 and, for this reason, the block 44*a* is not added to the block database 22. Similarly, the third block 44*c* "efghijk" of the second data item 40*b* is already found in the block database 22 at storage location 003. Blocks 02 and 04 of the second data item 40*b* are not located in the block database 22 and are added at storage locations 005 and 006, respectively. FIG. 6 depicts the block database 22 after the blocks 44 from the second data item 40*b* have been added to the block database 22.

Figure 7:
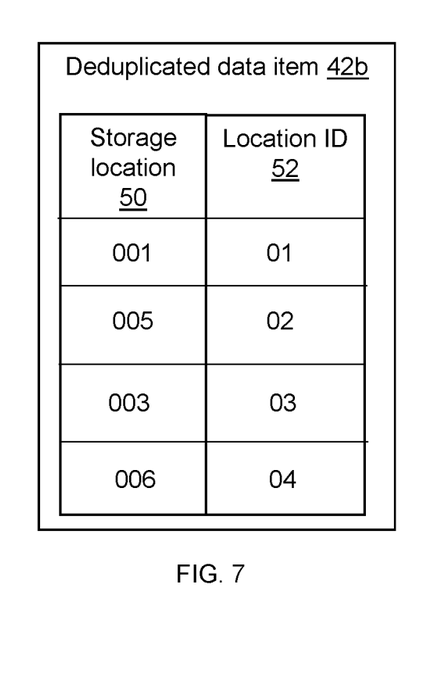

Turning to FIG. 7, the second deduplicated data item 42*b* is depicted. As shown, the deduplicated data item 42*b* includes a list of storage locations 50 (pointing to particular blocks 44 stored in the block database 22) and a location ID 52 indicating where the particular block 44 is placed in the data item 40*b*. For example, the second deduplicated data item 42*b* shows that the first location in the data item 40*b* (identified by location ID 01) is stored at storage location 001 (block contents "abcd"). Similarly, the second location in data item 40*b* (identified by location ID 02) is stored at storage location 005 (block contents "54"), the third location in data item 40*b* (identified by location ID 03) is stored at storage location 003 (block contents "efghijk"), and the fourth location in data item 40*b* (identified by location ID 04) is stored at storage location 006 (block contents "42").

Figure 8:
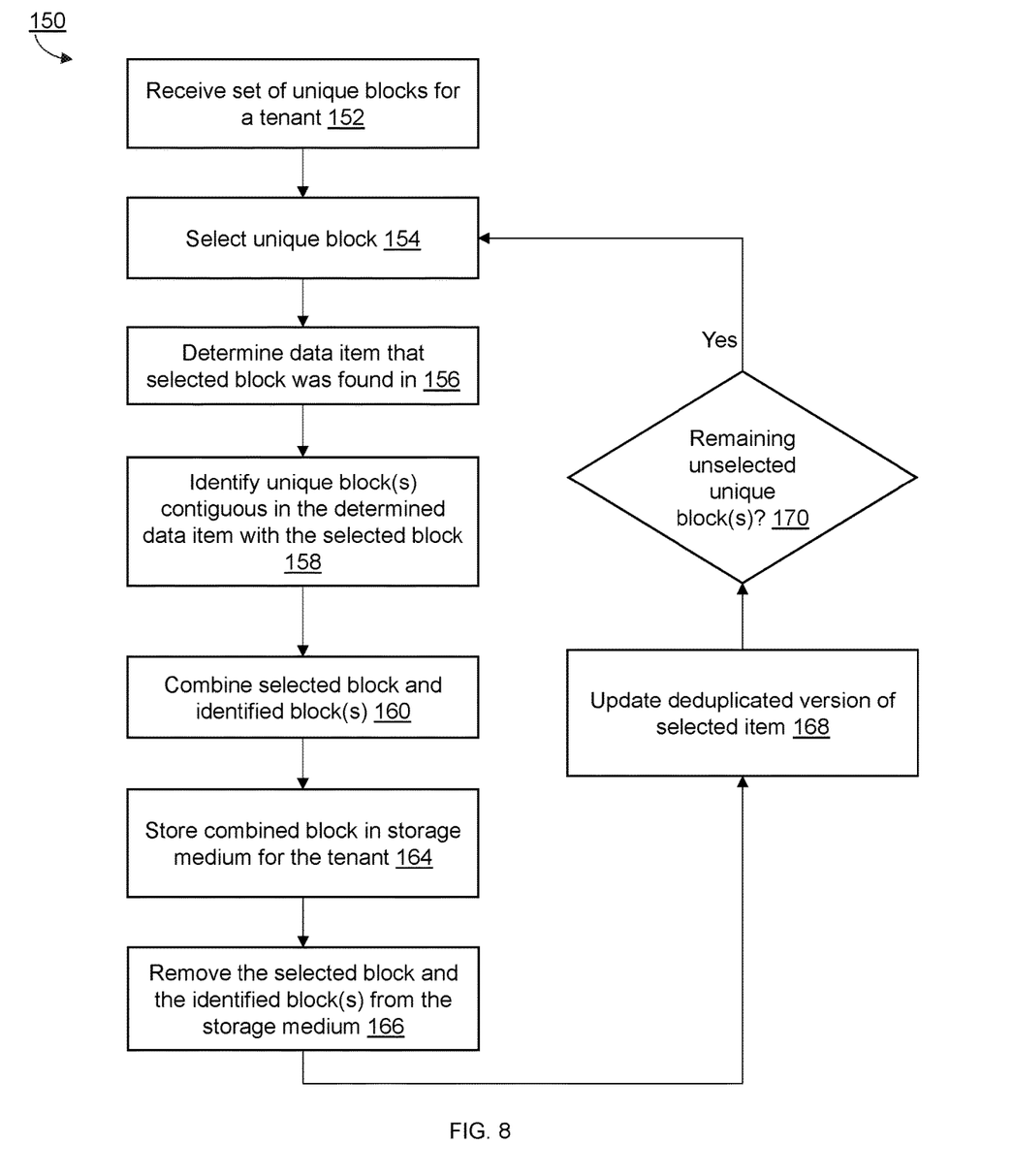
FIG. 8 is a block diagram depicting an exemplary method for combining contiguous unique blocks generated during data deduplication.

Turning to FIG. 8, a computer-implemented method 150 for combining unique contiguous blocks 44 generated during data deduplication of data stored on the storage medium 12 is shown. The method 150 is performed at least in part by the circuitry 14 and may be performed in conjunction with or separate from the method 100 for providing tenant aware, variable length, deduplication. By combining unique blocks, the computing resources required to reconstitute a deduplicated data item 42*a*,42*b*,42*c*,42*d* (i.e., recreate the data item 40*a*,40*b* from the blocks stored in the block database 22) are reduced. For example, if a deduplicated data item 42*a*,42*b*, 42*c*,42*d* includes 74 blocks (sixteen of which are unique to the data item 40*a*,40*b*), then the data deduplication device 10 is required to access 74 locations in the block database 22 to reconstitute the data item 40*a*,40*b*. If eleven of the sixteen unique blocks can be combined into a single block, then the total number of blocks 44 required to reconstitute the data item 40*a*,40*b* is reduced to 64 blocks. This reduces the number of blocks 44 that need to be accessed in the block database 22 (decreasing the computing resources required to reconstitute the data item 40*a*,40*b*) and also reduces the total number of blocks 44 stored in the block database 22.

In process block 152, a set of unique blocks 44 associated with the given tenant 38*a*, 38*b* are received from the storage medium 12. Each block 44 of the set of unique blocks 56 has been found in only one of the data items 40*a*,40*b* associated with the given tenant 38*a*, 38*b*. In process block 154, a unique block 44 is selected. The set of unique blocks 44 may be limited to at least one of blocks 44 created more than a duration of time ago or particular blocks 44 where more than a threshold number of deduplicated versions 42*a*,42*b*,42*c*, 42*d* of data items have been generated on the storage medium 12 for the tenant 38*a*, 38*b* associated with the set of unique blocks 44 since the particular block 44 was stored on the storage medium 12 in association with the given tenant 38*a*, 38*b*. For example, unique blocks 44 may be limited to blocks 44 created more than one month ago or to blocks 44 where more than 100 data items 40*a*,40*b* have been created since the unique block 44 was stored.

As will be understood by one of ordinary skill in the art, the time duration since creation may be any suitable duration (e.g., two weeks, two months, three months, etc.) and is not limited to one month. Similarly, the number of data items since creation is not limited to 100, but may be any suitable number of data items (e.g., 50, 500, 1000, etc.).

In process block 156, the particular data item 40*a*,40*b* that the selected block 44 was found in is determined. In process block 158, at least one other block 44 of the set of unique blocks 56 that is found only in the determined data item 40*a*,40*b* is located where a combination of the particular block 44 and the at least one block 44 is a contiguous block found in the determined data item 40*a*,40*b*. For example, assume that tenant A has three unique blocks X, Y, and Z that are found only in data item B. If blocks X and Y are next to one another in data item B (i.e., no other blocks 44 are located between block X and Y), then combining data items X and Y results in a contiguous block. But, if there is another block Q that is between blocks Y and Z, then unique blocks Y and Z cannot be combined to form a contiguous block.

In process block 160, the selected block 44 and the identified other block(s) are combined into a combined block. In process block 164, the combined block 44 is stored in association with the given tenant on the storage medium 12. In process block 166, the selected block 44 and the identified other block(s) (that were combined into the combined block) are removed from the storage medium 12.

In process block 168, the deduplicated version 42*a*,42*b*, 42*c*,42*d* of the selected data item 40*a*,40*b* is updated to replace the storage identifiers 50 associated with the selected block 44 and the other block(s) (that were combined into the combined block) with a storage identifier 50 describing a location of the combined block 44 on the storage medium 12. Updating the deduplicated version 42*a*,42*b*,42*c*,42*d* of the selected data item 40*a*,40*b* also includes replacing the location identifiers 52 associated with the selected block 44 and the other block(s) (that were combined into the combined block) with a location identifier 52 associated with the storage identifier 50 of the combined block 44 and describing a location of the combined block 44 in the particular data item.

In decision block 170, a check is performed to determine if there are any remaining unselected unique block(s). If yes, then processing returns to process block 154, where an unselected unique block 44 is selected.

Figure 9:
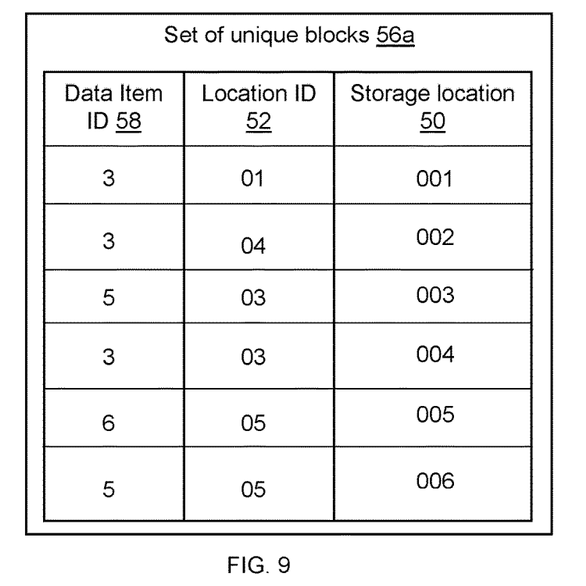
FIG. 9 is a schematic diagram of an exemplary list of unique blocks.
Figure 10:
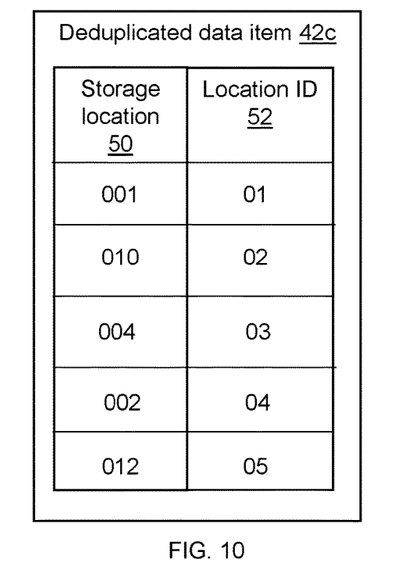
FIG. 10 is a schematic diagram of an exemplary deduplicated data item.

Turning to FIGS. 9-12, the combination of unique contiguous blocks 44 is shown. FIG. 9 depicts an exemplary set of unique blocks 56*a* before unique contiguous blocks 44 have been combined. The set of unique blocks 56 includes a data item identifier 58 that the block 44 is located in, the location ID 52 of the block 44 in the data item 40*a*,40*b*, and the storage location 50 of the block 44 in the block database 22. FIG. 10 depicts a deduplicated data item 42*c* having five blocks 44 (for which the storage location 50 and location ID 52 of the blocks 44 are provided).

Figure 11:
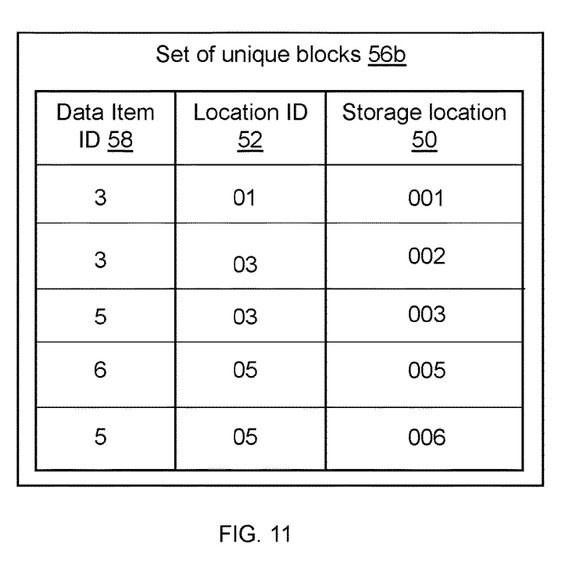
FIG. 11 is a schematic diagram of the list of unique blocks shown in FIG. 9 after combination of contiguous unique blocks.
Figure 12:
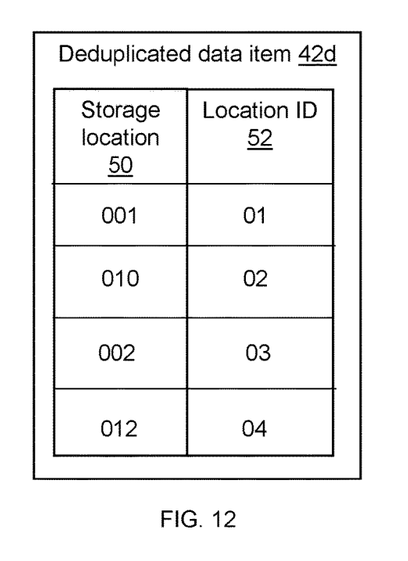
FIG. 12 is a schematic diagram of the deduplicated data item after combination of contiguous unique blocks.

Turning to FIG. 11, the set of unique blocks 56*b* is shown after the unique contiguous blocks 44 have been combined. In FIG. 9, there are three unique blocks 44 found in data item ID 3 (shown in FIG. 10). The unique blocks 44 are found at location ID 01, 04, and 03. The first unique block 44 (found at location ID 01), is not contiguous with any of the other unique blocks 44 for the third data item 42*c*. But, the second and third unique blocks 44 are contiguous with one another (i.e., found in neighboring locations 03 and 04). For this reason, the second and third unique blocks 44 are combined into a single unique block 44. This single unique block 44 is then used to replace the second and third unique blocks 44 in the set of unique blocks 56*b*. That is, the new combined unique block 44 is now listed in the second row of the set of unique blocks 56*b* at the location ID 03 and storage location 002. In the block database 22, the block 44 in storage location 002 has been replaced with the content of the combination of the second and third unique blocks. For example, if the second unique block 44 contained "1234" and the third unique block 44 contained "qrsw", the combined block 44 would contain "1234qrsw". Similarly, the deduplicated data item 42*c* has been updated to remove reference to the second and third unique blocks, and instead now references the location of the combined block 44.

Also, blocks 44 following combined unique blocks in the deduplicated data item 42*d* may be updated to reflect that the number of blocks 44 has been reduced. For example, deduplicated data item 42*c* includes five blocks (represented by five location IDs 52). After combining the unique blocks, the deduplicated data item 42*d* only includes four blocks. To compensate for the reduction in the total number of blocks, the location ID of the block(s) following the combined block may be updated to reflect that the number of blocks has decreased (i.e., the location ID 52 of the last blocks is changed from 05 to 04 in FIG. 12).

As described, tenant aware, variable length, data deduplication may be performed by a data deduplication device 10. The storage medium 12 of the data deduplication device 10 stores the data items 40a,40b and each of the plurality of data items 40a,40b is associated with a particular tenant 38a, 38b of a group of tenants. That is, the storage medium 12 stores data for a number of different tenants 38a, 38b.

As will be understood by one of ordinary skill in the art, the storage medium 12 may be, for example, one or more of a buffer, a flash memory, a hard drive, a removable media, a volatile memory, a non-volatile memory, a random-access memory (RAM), or other suitable device. In a typical arrangement, the storage medium 12 may include a non-volatile memory for long term data storage and a volatile memory that functions as system memory for the circuitry 14. The storage medium 12 may exchange data with the circuitry 14 over a data bus.

Accompanying control lines and an address bus between the storage medium 12 and the circuitry 14 also may be present. The storage medium 12 is considered a non-transitory computer readable medium.

The circuitry 14 of the data deduplication device 10 is configured to receive, from the storage medium 12, a set of data items 40a,40b associated with a given tenant 38a, 38b. For each respective data item 40a,40b, the circuitry is configured to generate a deduplicated version 42a,42b,42c, 42d of the respective data item 40a,40b on the storage medium 12. The generation of the deduplicated version 42a,42b,42c,42d of the respective data item 40a,40b includes determining a plurality of blocks 44 included in the respective data item 40a,40b, creating the deduplicated version 42a,42b,42c,42d of the respective data item 40a, 40b, and performing deduplication. Performing deduplication includes, for each respective block 44 of the determined plurality of blocks, determining if the respective block 44 exists on the storage medium 12 in association with the given tenant 38a, 38b. When the respective block 44 does not exist on the storage medium 12 in association with the given tenant 38a, 38b, the circuitry is configured to store the respective block 44 in association with the given tenant 38a, 38b on the storage medium 12.

Performing deduplication also includes, for each respective block 44 of the determined plurality of blocks, updating the deduplicated version 42a,42b,42c,42d of the respective data item 40a,40b to include a storage identifier 50 describing a location of the respective block on the storage medium 12 and a location identifier 52 associated with the storage identifier of the respective block and describing a location of the respective block 44 in the respective data item 40a,40b. Performing deduplication also includes storing the deduplicated version 42a,42b,42c,42d of the respective data item 40a,40b in the storage medium 12.

As will be understood by one of ordinary skill in the art, the circuitry 14 may have various implementations. For example, the circuitry 14 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 14 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 14. The circuitry 14 may be communicatively coupled to the computer readable medium 12 and communication interface 32 through a system bus, mother board, or using any other suitable structure known in the art.

The data deduplication device 10 may also include a communication interface 32 configured to send/receive data to/from the accessing device(s) 16a, 16b. As will be understood by one of ordinary skill in the art, the communication interface 32 may comprise a wireless network adaptor, an Ethernet network card, or any suitable device that provides an interface between the data deduplication device 10 and a network. The communication interface 32 may be communicatively coupled to the computer readable medium 12, such that the communication interface 32 is able to send data stored on the computer readable medium 12 across the network and store received data on the computer readable medium 12. The communication interface 32 may also be communicatively coupled to the circuitry 14 such that the circuitry is able to control operation of the communication interface 32. The communication interface 32, computer readable medium 12, and circuitry 14 may be communicatively coupled through a system bus, mother board, or using any other suitable manner as will be understood by one of ordinary skill in the art.

As will be understood by one of ordinary skill in the art, the data deduplication device 10 may comprise a computer system. For example, the data deduplication device 10 may comprise one or more servers. Similarly, each accessing device 16a, 16b may comprise one or more computers, laptops, tablet computers, mobile devices, or any suitable electronic device for accessing data stored on the data deduplication device 10.

It should be appreciated that many of the elements discussed in this specification may be implemented in a hardware circuit(s), a circuitry executing software code or instructions which are encoded within computer readable media accessible to the circuitry, or a combination of a hardware circuit(s) and a circuitry or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer readable media, or a combination of a hardware circuit(s) and a circuitry and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

The invention claimed is:

1. A data deduplication data storage medium comprising:
   one or more tenant storage areas stored on the data deduplication data storage medium;
      each tenant storage area comprising a plurality of data items;
      each data item comprising a plurality of item blocks;
      where each item block comprises a pointer to a storage location in a deduplicated block database; and
   the deduplicated block database stored on the data deduplication data storage medium;
      the deduplicated block database comprising a plurality of the storage locations and a plurality of data blocks,
      where the data blocks are unique for an individual tenant storage area,
      where all unique, contiguous data blocks for the individual tenant storage area are stored as a single combined block.

2. The data deduplication data storage medium of claim 1 wherein the one or more tenant storage areas are stored in circuitry.

3. The data deduplication data storage medium of claim 2 wherein the circuitry is a non-transitory computer readable medium.

4. The data deduplication data storage medium of claim 3 wherein the non-transitory computer readable medium is a hard drive.

5. The data deduplication data storage medium of claim 1 wherein the data deduplication data storage medium is a flash memory.

6. The data deduplication data storage medium of claim 1 wherein the data deduplication data storage medium is a backup storage location.

7. The data deduplication data storage medium of claim 1 wherein the plurality of data items further comprises an access date.

8. The data deduplication data storage medium of claim 7 wherein the plurality of data items further comprises statistics on a frequency of access to the data item.

9. The data deduplication data storage medium of claim 8 wherein the statistics include a historical mean.

10. The data deduplication data storage medium of claim 1 wherein at least one of the single combined blocks comprise a plurality of previously distinct data blocks.

11. A method comprising:
    receiving, from a storage medium, a set of data items, said set of data items arranged into blocks;
    identifying a set of unique contiguous blocks in the set of data items using block markers;
    combining the set of the unique contiguous blocks from the set of unique contiguous blocks to create a single unique contiguous block;
    replacing the set of the unique contiguous blocks with the single unique contiguous block in the set of unique contiguous blocks;
    specifying a storage location and location identifier for the single unique contiguous block;
    replacing the single unique contiguous block in the storage location with content of the combination of the unique contiguous blocks to perform deduplication; and
    updating the data items to remove references to the unique contiguous blocks, wherein the data item refers to the combined single unique contiguous block.

12. The method of claim 11 wherein the storage medium is a removable media.

13. The method of claim 11 wherein the storage medium is a backup storage location.

14. The method of claim 11 further comprising checking data item access statistics before retrieving the set of data items.

15. The method of claim 14 wherein the checking comprises comparing a last access date to an access threshold date.

16. The method of claim 14 wherein the checking comprises comparing a creation date to a threshold date.

17. The method of claim 14 wherein the checking comprises comparing a number of data items created since the data item was created.

18. The method of claim 11 wherein an identity of the set of unique contiguous blocks are determined based on a file format of the data items.

19. The method of claim 18 wherein the file format of the set of data items includes the block markers for identifying existing blocks within each of the set of data items.

20. The method of claim 11 wherein determining if the single unique contiguous block exists on the storage medium includes applying a hash function to the single unique contiguous block to determine a hash value for the single unique contiguous block.

* * * * *